(12) United States Patent
Kuo

(10) Patent No.: US 7,983,925 B1
(45) Date of Patent: Jul. 19, 2011

(54) EFFICIENT COMPUTATION METHOD FOR DETERMINING HOUSE PRICE INDICES

(75) Inventor: Chionglong Kuo, Washington, DC (US)

(73) Assignee: Fannie Mae, Washington, DC (US)

( * ) Notice: Subject to any disclaimer, the term of this patent is extended or adjusted under 35 U.S.C. 154(b) by 1219 days.

(21) Appl. No.: 11/653,984

(22) Filed: Jan. 17, 2007

Related U.S. Application Data

(63) Continuation of application No. 10/328,162, filed on Dec. 26, 2002, now abandoned.

(60) Provisional application No. 60/343,173, filed on Dec. 31, 2001.

(51) Int. Cl.
*G06Q 10/00* (2006.01)
*G06F 17/30* (2006.01)

(52) U.S. Cl. .......................... 705/1.1; 705/10

(58) Field of Classification Search .................. 705/1.1, 705/10
See application file for complete search history.

(56) References Cited

U.S. PATENT DOCUMENTS

| | | | |
|---|---|---|---|
| 5,361,201 A | 11/1994 | Jost et al. | |
| 5,893,069 A | 4/1999 | White, Jr. | |
| 6,401,070 B1 | 6/2002 | McKManus et al. | |
| 6,510,419 B1 | 1/2003 | Gatto | |
| 6,609,109 B1 | 8/2003 | Bradley et al. | |
| 6,609,118 B1 | 8/2003 | Khedkar et al. | |
| 6,681,211 B1 | 1/2004 | Gatto | |
| 6,842,738 B1 | 1/2005 | Bradley et al. | |
| 6,876,955 B1 | 4/2005 | Fleming et al. | |
| 2002/0059126 A1 | 5/2002 | Ricciardi | |
| 2003/0046199 A1 | 3/2003 | Murase et al. | |
| 2003/0078878 A1 | 4/2003 | Opsahl-Ong | |
| 2004/0010443 A1 | 1/2004 | May et al. | |

OTHER PUBLICATIONS

Andrews, R.L. & Ferguson, J.T., Integrating Judgment with Regression Appraisal:, Real Estate Appraiser and Analyst, Spring 1986, pp. 71-74.
Case, B. & Quigley, J.M., "The Dynamics of Ral Estate Prices", Rev. of Econ. & Stats., Feb. 1991, 73(1), pp. 50-58.
Case, K.E. & Shiller, R.J., Forecoasting Prices and Excess Returns in the Housing Market:, J. of the AREUEA, 1990, 18(3), pp. 253-273.
Pace, R.K. & Gilley, O.W., "Appraisal Across Jurisdictions Using Bayesian Estimation with Bootstrapped Priors for Secondary Mortgage market Applications", Prop. Tax J, Mar. 1989, 8(1), pp. 27-42.
Quigley, J.M. "A Simplee Hybrid Model for Estimating Real Estate Price Indexes", J. Housing Econ., Mar. 1995, 4(1), pp. 1-12.
Raftery, A. et al., "Model Selection adn Accounting for Model Uncertainty in Linear Regression Models", Nov. 19, 1993, U of Washington, pp. 1-24.
Sessions, D.N. & Chatterjee, S., "The Combining of Forecast Using Recursive Techniques with Non Stationary Weights", J. of Forecasting, 1989, 8(3), pp. 239-251.
Case et al., "On Choosing Among House Price Index Methodologies", (Journal of the American Real Estate & Urban Economics Association, vol. 19, No. 3, 1991, pp. 286-307.
Abraham et al., "New AEvidence on Home Priceis from Freddie Mac Repeat Sales", (jouranl of the Americaln Real Estate & Urban Economics Association, Fall 1991, vol. 19, Issue 3, pp. 333-352.

*Primary Examiner* — Naresh Vig
(74) *Attorney, Agent, or Firm* — Rader, Fishman & Grauer PLLC

(57) ABSTRACT

The present invention relates to an efficient computer implemented method and system for generating a home price index based on a repeat sales model by calculating the time-dimension frequency matrices (X'X and X'$\Omega^{-1}$X) and price change matrices (X'Y and X'$\Omega^{-1}$Y) directly without the need to calculate the big X and Y matrices at the dimension of the number of repeat sales. The inventive method may further be used to estimate indices for multiple geographic levels without processing an entire data set to estimate the price indices for each geographic level.

10 Claims, 2 Drawing Sheets

EFFICIENT COMPUTATION METHOD FOR DETERMINING HOUSE PRICE INDICES

This application is a continuation of application Ser. No. 10/328,162 filed on Dec. 26, 2002 now abandoned, which claims the benefit of U.S. Provisional Application No. 60/343,173, filed on Dec. 31, 2001, the entire contents of which are hereby incorporated by reference.

FIELD OF THE INVENTION

The present invention relates to an efficient method and apparatus for determining a real estate price index based on repeat sales data associated with properties in a real estate market.

BACKGROUND OF THE INVENTION

Determining a real estate price index is important to entities such as buyers, sellers, real estate agents, lenders, and financial institutions that participate in a real estate marked. For example, an accurate index enables sellers to formulate realistic expectations as to the trend in values of the properties being sold and to set appropriate sales prices for those properties. Buyers, on the other hand, rely on accurate trend estimates to formulate offers for the purchase of properties. Real estate price indexes are typically created for a specific geographic level, e.g., local, regional, and national. An accurate index also enables an estimation of the market-level value of a property and loan-to-value ratio of a mortgage. Lenders and financial institutions that buy and sell mortgages may depend on these estimates to determine the value of a particular mortgage or portfolio of mortgages and the risk associated with holding such mortgages.

A repeat sale model is one method for estimating a real estate price index. One repeat sale model proposed by Bailey, Muth, and Nourse (the BMN model) specifies that the change in the logarithm price of a property over a known period of time is equal to the change in a logarithmic price index plus an error term. Another repeat sales model by Case and Shiller (the Case-Shiller model) improves the BMN method. Unlike the BMN model that assumes that the error term is independent, the Case-Shiller model assumes that the variance of the error term is a linear function of the time between sales and the Case-Shiller model is implemented in three steps. The BMN method and the improved Case-Shiller model also require a large number of calculations to manipulate data relating to a large number of properties. Therefore, in real world situations, the BMN model and Case-Shiller model require lengthy processing times and heightened computing power requirements.

What is needed, therefore, is an efficient computation method for the estimation of indices in the context of the original BMN model, the Case-Shiller method and other repeat sales models.

SUMMARY OF THE INVENTION

One aspect of the invention relates to a method of calculating a home price index. The method includes the steps of calculating and X'X matrix of $(T-1)\times(T-1)$ dimension directly and calculating an X'Y matrix of $(T-1)\times 1$ dimension directly without constructing an X matrix; and using the formula $\hat{b}=(X'X)^{-1}X'Y$, wherein Y is an $N\times 1$ matrix of the change in the log price of individual properties, X is an $N\times(T-1)$ design matrix of 0, 1, or $-1$, and b is a $(T-1)\times 1$ matrix of log price indices.

The X'X matrix may be calculated by accessing sale price $(p_1)$, resale price $(p_2)$, sale time period $(t_1)$, and resale time period $(t_2)$ data for (N) number of properties occurring over T time periods with the computer; initializing a T×T matrix W with zeros wherein each element of W has a row and column coordinate of $(x,y)$; determining the number of properties $(n_{(t_1,t_2)})$ for which a sale occurs in a first time period $(t_1)$ and a resale occurs in a second time period $(t_2)$; adding $-n_{(t_1,t_2)}$ to each element of W for which $(x=t_1, y=t_2)$ and $(x=t_2, y=t_1)$; summing the values in each column of W and entering the negative of the sum at the element $(x,y)$ in the column at which $x=y$; removing the row and column of W that correspond to the base period. The inventive method calculates the X'Y matrix by initializing a T×T matrix R with zeros wherein each element of R has a row and column coordinate of $(x,y)$; determining for each property, the difference between the log of the sale price $(\log p_1)$ at a first time period $(t_1)$ and the log of the resale price $(\log p_2)$ at a second time period $(t_2)$; determining for each pair of time periods $(t_1, t_2)$ where $t_1<t_2$, the sum of the log price differences of all those properties with a sale at the first time period $t_1$ and a resale at the second time period $t_2$; adding the log price difference sum for each time period pair $(t_1,t_2)$ to the $(x,y)$ element of R at which $x=t_1$ and $y=t_2$; adding the negative of the log price difference sum for each time period pair $(t_1,t_2)$ to the $(x,y)$ element of R at which $x=t_2$ and $y=t_1$; summing the values in each column of R; initializing a T×1 column vector S with zeros; entering the sum of the values of each column of R in a corresponding column element of S; and removing the entry of S that corresponds to the base period.

Another aspect of the invention relates to a method of estimating a linear or quadratic dispersion function in a second stage regression of a three-stage procedure by making use of the matrix at a dimension of K×3, wherein K is the number of pairs of time periods. The invention estimates the dispersion regression of a repeat sales model by calculating a Z'Z matrix; calculating a Z'Q matrix; and calculating a second stage regression with the equation $\hat{\beta}=(Z'Z)^{-1}Z'Q$.

The Z'Z matrix may be calculated by constructing a k×3 matrix $Z_s$, where k is the number of different combinations of sale-resale time pairs and each row represents a combination of the sale-resale time combination and wherein a first column of $Z_s$ is populated with ones, a second column is the time interval between sales, and a third column is the squared sales interval; multiplying each row of $Z_s$ by the number of repeat transactions for that sale-resale pair and denoting the resulting matrix by $F_s$; and calculating an equation where $Z'Z=Z_sF_s$. The method calculates the Z'Q matrix by using the k×3 matrix $Z_s$ constructed for the calculation of Z'Z; constructing a k×1 matrix $\hat{y}_s$, where k is the number of different combinations of sale-resale time pairs and each row represents a sale-resale time combination and wherein each column of $y_s$ is populated with the sum of squared difference in log price of all the transactions with the corresponding sale-resale time pair; constructing a k×1 matrix $\hat{y}_s$ wherein each column of $\hat{y}_s$ is populated with the number of transactions multiplied by the squared prediction of difference of the log price obtained for the corresponding sale-resale time pair; constructing a k×1 matrix $Q_s=y_s+\hat{y}_s-2(y_s\#\hat{y}_s)$, where # denotes a matrix operation that produces a matrix whose element is the product of corresponding elements in the two matrices $y_s$ and $\hat{y}_s$; and calculating an equation where $Z'Q=Z_sQ_s$.

Another aspect of the invention relates to an efficient method of calculating a dispersion-weighted home price index $\hat{b}=(X'\Omega^{-1}X)^{-1}X'\Omega^{-1}Y$, by using the reciprocal of square roots of fitted values from a second stage regression as a weights for a third stage regression, where Ω is an N×N diagonal matrix with the (i,i) element equal to the fitted value obtained from a second stage regression and wherein Y is an N×1 matrix of the change in the log price of individual properties, X is an N×(T−1) design matrix of 0, 1, or −1.

The method may also estimate indices for multiple geographic levels without repeated processing of an entire data set to estimate the price indices for each geographic level, by calculating matrices for each geographic level, starting from a lowest geographic level; using calculated matrices for each geographic level to calculate the matrices for the a higher geographic level until the matrices and indices for each geographic level are calculated.

Additional features and advantages of the invention will be set forth in the description that follows, and in part will be apparent from the description, or may be learned by practice of the invention. The objectives and advantages of the invention will be realized and attained by the system and method particularly pointed out in the written description and claims hereof as well as the appended drawings.

BRIEF DESCRIPTION OF THE DRAWINGS

The accompanying drawings, which are included to provided a further understanding of the invention and are incorporated in and constitute a part of this specification, illustrate embodiments of the invention that altogether with the description serve to explain the principles of the invention.

In the drawings.

DESCRIPTION OF THE PREFERRED EMBODIMENTS

Reference will now be made in detail to the preferred embodiments of the present invention, examples of which are illustrated in the accompanying drawing. The present invention described below extends the functionality of the inventive system and method for estimating a real estate price index based on repeat sales data for properties in a market.

Figure 1:
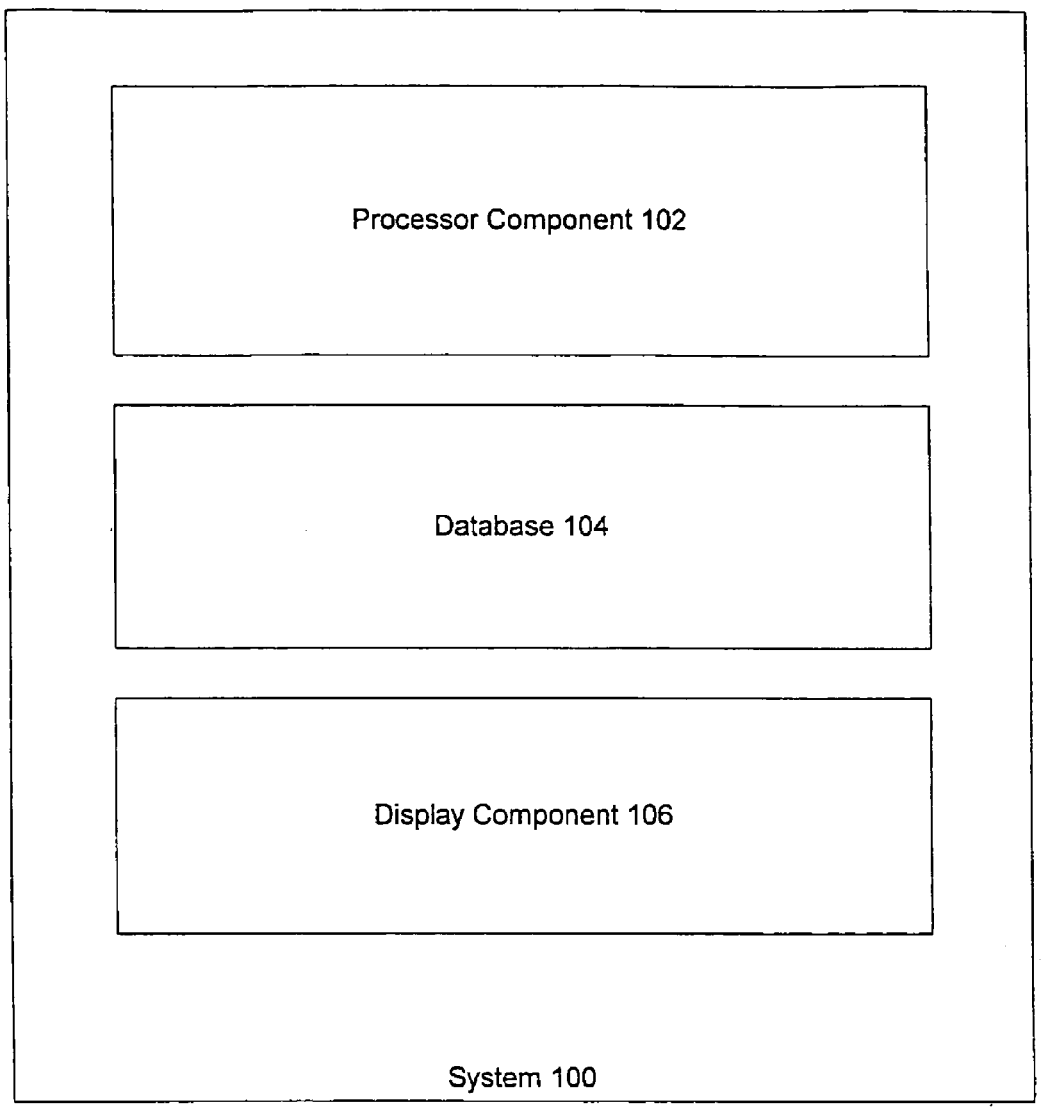
FIG. 1 illustrates a computer system that is configured to facilitate in determining a real estate price index for a real estate marked based on repeat sales data.

FIG. 1 illustrates a computer system 100 that is configured to facilitate in determining a real estate price index for a real estate marked based on repeat sales data. Computer system 100 comprises a processor 102, a memory component 104 and a display component 106. Processor 102 is configured to execute a three-stage regression procedure to determine and report estimates of real estate price indices in a given market. An embodiment of the present invention is based on matrix operations that may be implemented on processor 102 using a matrix programming language, such as SAS IML, GAUSS, or MATLAB. Memory component 104 is capable of storing sales data relating to a plurality of properties, wherein the data for each property includes at least two sales prices over a period of time. Upon determining the price indices, processor 102 communicates the indices to a user through display component 106 or other display means.

The present invention provides an efficient computation method to estimate price indices based on the BMN model, the Case and Shiller model, and other repeat sales index models. The improved method disclosed herein reduces the number of calculations required for a given data set of property sales by eliminating the need to carry out a large number of multiplications by zero. By reducing the number of calculations required, the speed and cost of implementing the method on a computer are improved upon. In the inventive system, if a property includes multiple sales prices over time, the sales prices are paired up to estimate the index for the property. For the purposes of the present invention a first sale price for each property is denoted as $p_1$, a second or resale price is denoted as $p_2$, a first sale time period is denoted as $t_1$, and a second or resale time period is denoted as $t_2$.

In the first stage of the present invention, it is presumed that there are N pairs of sales occurring during T periods. For the estimation of the indices with period T as the based period, the first stage regression can be represented by:

$$Y = Xb + \epsilon \quad \text{Equation 1}$$

Where Y is an N×1 matrix of the change in the log price of individual properties, X is an N×(T−1) design matrix of 0, 1, or −1, b is a (T−1)×1 matrix of log price indices, and ε is and N×1 matrix of residuals. Each observation for the regression model represents one pair of sales (a sale and a resale) associated with a property.

The OLS estimators for the log indices $\hat{b}$ are:

$$\hat{b} = (X'X)^{-1} X'Y. \quad \text{Equation 2}$$

The calculation of the predices log indices $\hat{b}$ can be divided into separate calculations of $(X'X)^{-1}$ and $X'Y$. The present invention provides a new method to calculate X'Y and X'Y without the need of constructing of the large X matrix. Since it is recognized that X'X is a (T−1)×(T−1) matrix in which each element can be located with an (x,y) coordinate for which x=(row number) and y=(column number), in the present invention, X'X can therefore be written as:

$$X'X = \sum_{(t_1,t_2)}^{N} (X_i' X_i)$$
$$= \sum_{(t_1,t_2)} n_{(t_1,t_2)} X'_{(t_1,t_2)} X_{(t_1,t_2)} \quad \text{Equation 3}$$

where $X_i$ is a (T−1)×1 matrix of the values of the independent variables for the ith pair of sales, $X_{(t_1,t_2)}$ is a (T−1)×1 matrix of the values of the independent variables for the observations with the first sales in $t_1$ and the second sales in $t_2$, and $n_{(t_1,t_2)}$ is the number of observations for which the first sales occur in $t_1$ and the second sales (i.e. resales) occur in $t_2$. Presuming the ith pair of sales occurred in periods $t_1$ and $t_2$ ($t_2 > t_1$, $t_2 \neq T$); then all of the elements of the $X_i' X_i$ matrix are zeros except for the (x,y)=($t_1,t_2$) and (x,y)=($t_2,t_1$) elements, which equal −1, and the (x,y)=($t_1,t_1$) and (x,y)=($t_2,t_2$) diagonal elements, which equal 1. If $t_2$=T, then all of the elements of $X_i' X_i$ are zeros except for the ($t_1,t_1$) diagonal entry, which equals 1. By summing up all the N pairs of sales, it can be shown that X'X is a symmetric matrix in which the ($t_1,t_2$) off-diagonal entry of X'X is equal to $-n_{(t_1,t_2)}$, and the (x,y) diagonal element X'X (where x=y) equals the total number of sales that occurred in the time period t=x=y.

Based on the foregoing, X'X can be determined with the following steps:

1. Initializing a T×T matrix (denoted by W) with zeros wherein each element of W has a row and column coordinate of (x,y).
2. For each pair of periods $t_1$ and $t_2$, adding $-n_{(t_1,t_2)}$ to the (x,y) elements of W for which (x=$t_1$, y=$t_2$) and for which (x=$t_2$, y=$t_1$).
3. Summing up all the values in each column and placing the negative of the sum at the corresponding diagonal element (where x=y) for the column.

4. Removing the row and column for the base period from W to yield the X'X matrix.

Populating the X'X matrix with values in accordance with the foregoing steps eliminates the need for an N×(T−1) matrix that is largely populated with zeros. Instead, a much smaller and manageable matrix that is only (T−1)×(T−1) is required.

Similarly, X'Y is a (T−1)×1 matrix where each row represents a different period t. Where there are N properties X'Y can be written as the sum of N matrices:

$$X'Y = \sum_{i=1}^{N}(X_i'X_i) \qquad \text{Equation 4}$$

$$= \sum_{(t_1,t_2)} n_{(t_1,t_2)} X'_{(t_1,t_2)} \overline{Y}_{(t_1,t_2)}$$

where $\overline{Y}_{(t_1,t_2)}$ is the average change in log price of the properties sold in both $t_1$ and $t_2$. If the ith pair of sales occurred in periods $t_1$ and $t_2$ ($t_2 > t_1$, $t_2 \neq T$), then all of the elements in the $X'_i Y_i$ matrix are zeros except the $x=t_1$ and $x=t_2$ entries. The $t_2$ entry equals $y_{it_2} - y_{it_1}$ and the $t_1$ entry equals $y_{it_1} - y_{it_2}$, where $y_{it}$ is the log price of property i at time period t. Thus the entry in row t of the X'Y matrix equals the sum of the changes in log prices of all the properties for which the second sale occurred in time period t minus the sum of the changes in log prices of all the properties for which the first sale occurred in time period t.

Based on the foregoing, X'Y can be determined using the following steps:
1. Initializing a T×T matrix R with zeros wherein each element of R has a row and column coordinate of (x,y).
2. For each property with a sale at $t_1$ and a resale at $t_2$, determining the difference or change in the log of the sale and resale prices (log $p_2$−log $p_1$) and adding the sum of changes in log prices of these properties to the ($x=t_1$, $y=t_2$) element of R and the negative of this sum to the ($x=t_2$, $y=t_1$) element of R.
3. Summing up the elements of each column of R to obtain a T×1 column vector S.
4. Removing the last element of S to obtain the X'Y matrix.

Following the determination of $\hat{b}$, the residuals, $\hat{\epsilon}$, may be determined for the second stage of the overall method. According to the inventive system, the second stage of the regression can be written as:

$$Q = Z\beta + \eta \qquad \text{Equation 5}$$

where Z is an N×3 matrix consisting of three variables: a constant, the holding periods for each of the properties, and the square of holding periods; and where Q is an N×1 matrix of the squared residuals $\hat{\epsilon}$ obtained in the first stage of the overall method. The model in Equation 5 is a quadratic dispersion model, which includes the BMN model and the Case and Shiller model as special cases. For the BMN model, the linear and the quadratic terms are assumed to be zeros, and for the Case and Shiller model the quadratic term is assumed to be zero.

The OLS estimator for $\hat{\beta}$ is:

$$\hat{\beta} = (Z'Z)^{-1} Z'Q \qquad \text{Equation 6}$$

In the absence of the present invention, $\hat{\beta}$ would be calculated by first constructing the Z and Q matrices and then carrying out the matrix operation according to Equation 6. Both Z and Q matrices have one dimension on N, the numbers of repeat sales, which could be large in a nationwide data set. In accordance with the first aspect of the present invention, Z'Z can be expressed as:

$$Z'Z = \sum_{i=1}^{N} Z'_i Z_i \qquad \text{Equation 7}$$

$$= \sum_{(t_1,t_2)} n_{(t_1,t_2)} Z'_{(t_1,t_2)} Z_{(t_1,t_2)}$$

With reference to Equation 7, $Z_{(t_1,t_2)} = [1, (t_2-t_1), (t_2-t_1)^2]$ and $n_{(t_1,t_2)}$ is the number of properties with the first sale at time $t_1$ and the second sale at time $t_2$.

In the new inventive system, Z'Z can be determined by the following procedures:
1. Construct a k×3 matrix $Z_s$, where k is the number of different combinations of sale-resale time pairs and each row represents a combination of the sale-resale time combination. The first column of $Z_s$ is populated with ones, the second column the time interval between sales, and the third column the squared sales interval.
2. Multiply each row of $Z_s$ by the number of repeat transactions for that sale-resale pair and denote the resulting matrix by $F_s$.
3. Calculate $Z'Z = Z'_s F_s$.

Similarly, Z'Q can be written as:

$$Z'Q = \sum_{i=1}^{N} Z'_i Q_i \qquad \text{Equation 8}$$

$$= \sum_{(t_1,t_2)} Z'_{(t_1,t_2)} \sum_{i=1}^{n_{(t_1,t_2)}} (y_{i(t_1,t_2)} - \hat{y}_{i(t_1,t_2)})^2$$

$$\sum_{(t_1,t_2)} Z'_{(t_1,t_2)} \left\{ \sum_{i=1}^{n_{(t_1,t_2)}} y_{i(t_1,t_2)}^2 + n_{(t_1,t_2)} \hat{y}_{(t_1,t_2)}^2 - 2\hat{y}_{i(t_1,t_2)} \sum_{i=1}^{n_{(t_1,t_2)}} y_{i(t_1,t_2)} \right\}$$

where $Z_{i(t_1,t_2)} = Z_{it_2} - Z_{it_1}$. Z'Q in Equation 8 can be determined by the following procedures:
1. Use the k×1 matrix $Z_s$ constructed for the calculation of Z'Z.
2. Construct a k×1 matrix $y_s$, where k is the number of different combinations of sale-resale time pairs and each row represents a sale-resale time combination. Each column of $y_s$ is populated with the sum of squared difference in log price of all the transactions with the corresponding sale-resale time pair.
3. Construct a k×1 matrix $\hat{y}_s$. Each column of $\hat{y}_s$ is populated with the number of transactions multiplied by the squared prediction of difference of the log price obtained for the corresponding sale-resale time pair.
4. Construct a k×1 matrix $Q_s = y_s + \hat{y}_s - 2(y_s \# \hat{y}_s)$, where # denotes a matrix operation that produces a matrix whose element is the product of corresponding elements in the two matrices $y_s$ and $\hat{y}_s$.
5. Calculate $Z'Q = Z'_s Q_s$.

The present invention makes use of the fact that the combination of $t_1$ and $t_2$ is at most $T(T-1)/2$, which is usually a much smaller number than the number of repeat sales N. In the third stage of the invention, the OLS estimators for the log indices b are:

$$\hat{b} = (X'\Omega^{-1}X)^{-1} X'\Omega^{-1} Y \qquad \text{Equation 9}$$

where $\Omega$ is an N×N diagonal matrix with the (i,i) element equal to the fitted value obtained from the second stage regression. The calculation of the log indices can be broken into ($X'\Omega^{-1}X$) and $X'\Omega^{-1}Y$. In the absence of the present invention, $X'\Omega^{-1}X$ would be calculated by first constructing the large X matrix and then performing the matrix operation according to Equation 9. With the present invention, the equation $X'\Omega^{-1}X$ can be written as:

$$X'\Omega^{-1}X = \sum_{i=1}^{N} (X_i'\Omega_i^{-1}X_i) \qquad \text{Equation 10}$$

$$= \sum_{(t_1,t_2)} \left( \frac{n_{(t_1,t_2)}}{\hat{Q}_{(t_1,t_2)}} \right) X'_{(t_1,t_2)} X_{(t_1,t_2)}$$

where $\Omega_i$ is the ith diagonal element of $\Omega$ and $\hat{Q}_{(t_1,t_2)}$ is fitted value from the second stage regression for the properties with sales during the time periods $t_1$ and $t_2$. If the ith pair of sales occurred in periods $t_1$ and $t_2$ ($t_2 > t_1$, $t_2 \neq T$), then the elements of $X'_i\Omega_i^{-1}X_i$ are zeros except the (x,y)=($t_1,t_2$) and the (x,y)–($t_2,t_1$) elements, which equal $-1/\hat{Q}_{(t_1,t_2)}$, and the (x,y)=($t_1,t_1$) and the (x,y)=($t_2,t_2$) diagonal elements, which equal $1/\hat{Q}_{(t_1,t_2)}$. If $t_2=T$, then all of the elements in the $X'_iX_i$ matrix are zeros except the ($t_1,t_1$) diagonal entry, which equals $1/\hat{Q}_{(t_1,t_2)}$. By summing up all the N pairs of sales, it can be shown that $X'\Omega^{-1}X = -n_{(t_1,t_2)}/\hat{Q}_{(t_1,t_2)}$ for the properties for which the first sale occurred in the time period $t_1$ and the second sale occurred in time period $t_2$. It can also be shown that the (t,t) diagonal element of $X'\Omega^{-1}X$ equals the sum of the off-diagonal elements in the ith row or ith column.

In view of the foregoing, the $X'\Omega^{-1}X$ matrix can be determined using the following steps:
1. Initializing a T×T matrix (denoted by W) with zeros.
2. For each pair of periods ($t_1,t_2$), adding ($-n_{(t_1,t_2)}/\hat{Q}_{(t_1,t_2)}$) to both the ($t_1,t_2$) and ($t_2,t_1$) entries.
3. Summing the values in each column and placing the negative of the sum for the column at the diagonal element of the column, i.e. the element at which x=y.
4. Removing the row and column for the base period from W to yield the $X'\Omega^{-1}X$ matrix.

Similarly, $X'\Omega^{-1}Y$ is a (t−1)×1 matrix with the kth row representing period k and can be written as:

$$X'\Omega^{-1}Y = \sum_{i=1}^{N} (X_i'\Omega_i^{-1}Y_i) \qquad \text{Equation 11}$$

$$= \sum_{(t_1,t_2)} \left( \frac{n_{(t_1,t_2)}}{\hat{Q}_{(t_1,t_2)}} \right) X'_{(t_1,t_2)} \bar{Y}_{(t_1,t_2)}$$

If the ith pair of sales occurred in periods $t_1$ and $t_2$($t_2>T_1$, $t_2 \neq T$), then all of the entries in the $X'_i\Omega_i^{-1}Y_i$ matrix are zeros except the $t_1$ and $t_2$ entries. The $t_2$ entry equals $(y_{it_2}-y_{it_1})/\hat{Q}_{(t_1,t_2)}$ and the $t_1$ entry equals $(y_{it_1}-y_{it_2})/\hat{Q}_{(t_1,t_2)}$, where $y_{it}$ is the log price of property i at time t. Thus the kth entry of $X'\Omega^{-1}Y$ equals the sum of deflated changes in log prices for which the second sale occurred in time k minus the sum of deflated changes in log prices for which the first sale occurred in time k. The deflator is the fitted value from the second stage regression, i.e., $\hat{Q}_{(t_1,t_2)}$.

The $X'\Omega^{-1}Y$ matrix can be determined using the following steps:
1. Initializing a T×T matrix (denoted by R) to zeros.
2. For each pair of periods ($t_1,t_2$), adding the sum of $(y_{it_2}-y_{it_1})/\hat{Q}_{(t_1,t_2)}$ for those properties that experienced a first sale at period $t_1$ and a second sale at period $t_2$ to the ($t_1,t_2$) element of R and the negative of this sum to the ($t_2,t_1$) element.
3. Summing up the elements of each column of R to obtain a T×1 column vector S.
4. Removing the entry of S that corresponds to the base period to obtain $X'\Omega^{-1}Y$.

Figure 2:
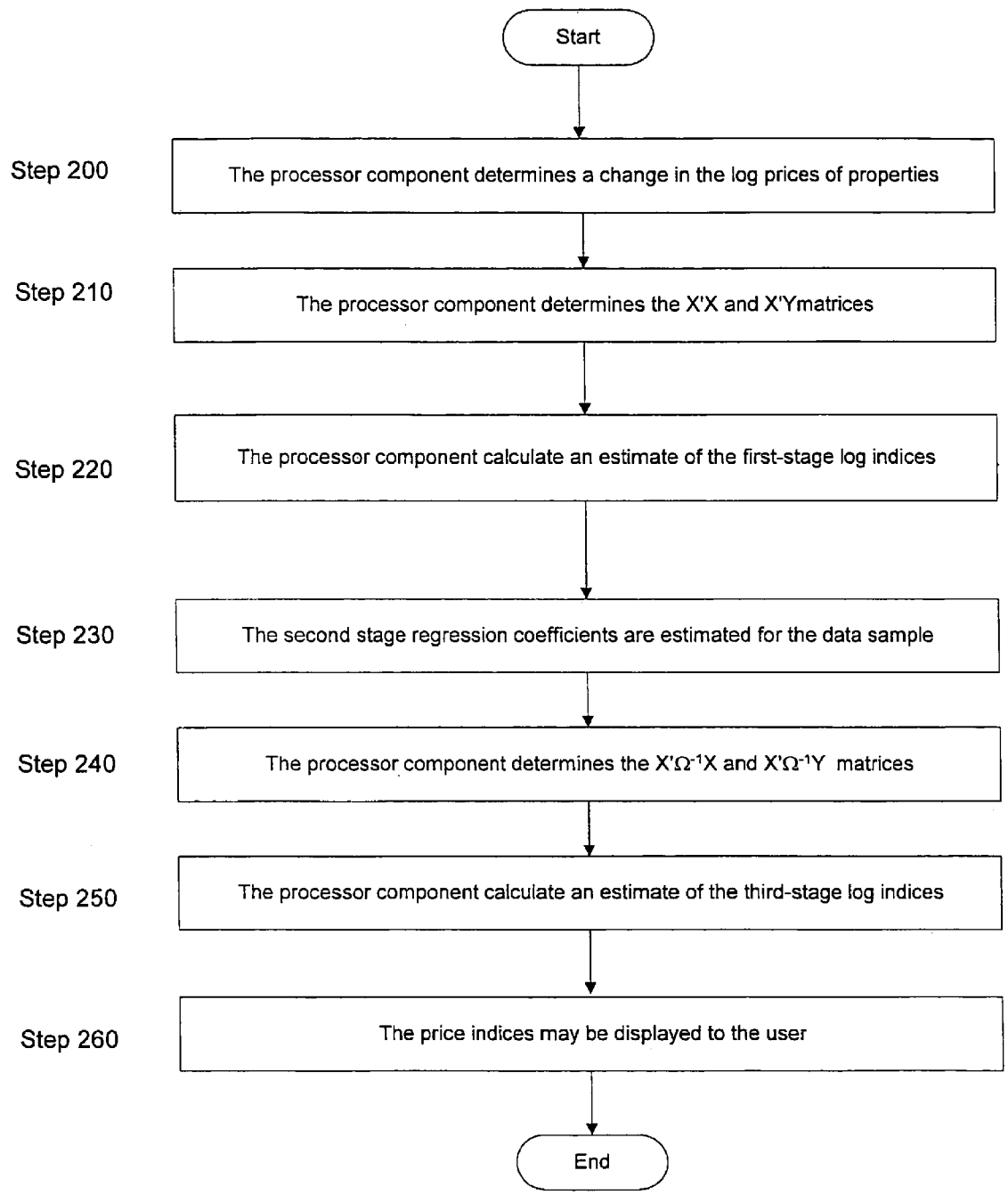
FIG. 2 illustrates the steps implemented in the inventive system and method.

FIG. 2 illustrates steps implemented in the inventive system and method. In step 200, processor component 102 determines the change in the log prices of properties. In Step 210, processor component 102 determines the X'X matrix and the X'Y matrix. In Step 220, once the X'X matrix and the X'Y matrix are known, processor component 102 calculates an estimate of the log indices, $\hat{b}$. In step 230, the second stage regression coefficients β are then estimated. In step 240, processor component predicts the log indices, $\hat{b}$. In step 250, the log indices $\hat{b}$ may be displayed to the user on component 106. In step 260, the log indices $\hat{b}$ may be used to determine and display predicted property prices.

Accordingly, equations 3 and 4 indicate that the log indices $\hat{b}$ can be calculated in two ways. The first way is to run the OLS regression on Equation 1, for which one observation represents one pair of sales. The second way is to run a weighted least squares (WLS) regression on a summarized data set for which each observation represents one pair of periods. In the WLS regression, the dependent variable is the average of the difference in log sale and resale prices for the repeat sales with the corresponding pair of sale periods. The weight for each observation is the square root of the number of properties sold in the corresponding pair of periods, i.e., $\sqrt{n_{(t_1,t_2)}}$ for the ($t_1,t_2$) pair of periods.

Equations 7 and 8 indicate that the second stage regression coefficients β can be estimated by running OLS on Equation 5 (which is the same method that may be used in the absence of the present invention) or preferably by running a WLS regression on a summarized data set in which each observation represents a pair of periods. In the WLS regression, the dependent variable for the ($t_1,t_2$) pair of periods is the average squared residuals, which were determined in the first stage of the method, for those properties that experienced a first sale in period $t_1$ and a second sale in period $t_2$. The weight is the same as those used in the first stage, i.e., the number of properties that were sold in both the $t_1$ and $t_2$ periods. Note that the prediction in the second stage for those properties sold during the same pair of periods is the same. The squared roots of the predicted values in the second stage are to be used as the weight in the third stage regression.

Equations 10 and 11 indicate that the log indices $\hat{b}$ can be calculated in two ways. The first way is to run a property-level WLS regression on Equation 1 with the weights equal to the predicted values in the second stage regression. The second way is to run a time-level WLS regression on a summarized data set for which each observation represents one pair of periods. In the WLS regression, the dependent variable is the average of the difference in log sale and resale prices for the repeat sales with the corresponding pair of sale periods. The weight for each observation is the square root of the number of properties divided by the square root of the fitted value in the second-stage regression for the corresponding pair of periods, i.e., $\sqrt{n_{(t_1,t_2)}/\hat{Q}_{(t_1,t_2)}}$ for the ($t_1,t_2$) pair of periods.

The computation efficiency of the present invention can be further utilized when multiple geographic levels of home price indices are to be estimated. For example, the home price indices at the zip, county, state, census region, and national levels may be estimated using the same set of data. Without the present invention, the entire data set would have to be processed for the estimation of each geographic level of indices. That is, the X and Y matrices of the dimension N×(T−1) have to be constructed for each geographic level of indices. Implementing the data identification method of the present invention, the X'X, X'Y, Z'Z, Z'Q, XΩX, and X'ΩY matrices may be calculated for the zip-level indices, and then these zip-level matrices may be used to calculate the corresponding matrices for the county-level indices, and then these county-level matrices may be used to calculate the corresponding matrices for the state-level indices. The state-level matrices do not need to be constructed from the property-level repeat sales data; the state-level matrices can be calculated by summing up the corresponding matrices for the counties in the respective state. Similarly, with the present invention, one would sum up the respective state-level matrices to calculate the census region matrices and indices. The census region matrices can in turn be used to calculate the national level matrices and indices. With present invention, the computation time for a higher geographic level of indices is significantly less than that without the present invention.

It will be apparent to those skilled in the art that variations and modifications of the present invention can be made without departing from the scope or spirit of the invention. For example, the program language and code selected to implement the aspects of the present invention may be varied without departing from the intended scope of the claims. Thus, it is intended that the present invention cover all such modifications and variations of the invention, provided they come within the scope of the appended claims and their equivalents.

What is claimed is:

1. A computer implemented method of calculating a repeat sales home price index, the method comprising:
    calculating by a computer an X'X matrix of $(T-1)\times(T-1)$ dimension directly and calculating an X'Y matrix of $(T-1)\times 1$ dimension directly without constructing an X matrix; and
    determining by the computer a home price index using the formula $\hat{b}=(X'X)^{-1}X'Y$, wherein N is a number of sale pairs occurring within a duration of T time periods, the Y matrix is an $N\times 1$ matrix of the change in the log price of individual properties, the X matrix is an $N\times(T-1)$ matrix of 0, 1, or $-1$, and $\hat{b}$ is a $(T-1)\times 1$ matrix of log price indices;
    outputting by the computer the determined home price index.

2. The method of claim 1, wherein calculating the X'X matrix further comprises:
    accessing sale price ($p_1$), resale price ($p_2$), sale time period ($t_1$), and resale time period ($t_2$) data for the N sale pairs occurring over the T time periods with the computer;
    initializing a $T\times T$ matrix W with zeros wherein each element of W has a row and column coordinate of (x, y);
    determining the number of properties ($n_{(t_1,t_2)}$) for which a sale occurs in a first time period ($t_1$) and a resale occurs in a second time period ($t_2$);
    adding $-n_{(t_1,t_2)}$ to each element of W for which ($x=t_1, y=t_2$) and ($x=t_2, y=t_1$);
    summing the values in each column of W and entering the negative of the sum at the diagonal element (x,y) at which x=y; and
    removing the row and column of W that correspond to the base period to yield the X'X matrix.

3. The method of claim 1, wherein calculating the X'Y matrix further comprises:
    initializing a $T\times T$ matrix R with zeros wherein each element of R has a row and column coordinate of (x, y);
    determining for each property, the difference between the log of the sales price (log $p_1$) at the first time period ($t_1$) and the log of the resale price (log $p_2$) at a second time period ($t_2$);
    determining for each pair of time periods ($t_1,t_2$) where $t_1<t_2$, the sum of the log price differences of all those properties with a sale at the first time period $t_1$ and a resale at the second time period $t_2$;
    adding the log price difference sum for each time period pair ($t_1, t_2$) to the (x,y) element of R at which $x=t_1$ and $y=t_2$;
    adding the negative of the log price difference sum for each time period ($t_1, t_2$) to the (x,y) element of R at which $x=t_2$ and $y=t_1$;
    summing the values in each column of R;
    initializing a $T\times 1$ column vector S with zeros;
    entering the sum of the values of each column of R in a corresponding column element of S; and
    removing the entry of S that corresponds to the base period.

4. The method of claim 1, wherein calculating the first stage home price matrix further comprises determining a price index using the W and S matrices.

5. The method of claim 1, further comprising:
    using the home price index to determine a predicted property price.

6. The system of claim 1, wherein calculating the first stage home price matrix further comprises determining a price index using the W and S matrices.

7. The system of claim 1, further comprising:
    means for using the home price index to determine a predicted property price.

8. A system for calculating a repeat sales home price index, the system comprising:
    calculating means, configured to calculate an X'X matrix of $(T-1)\times(T-1)$ dimension directly and calculating an X'Y matrix of $(T-1)\times 1$ dimension directly without constructing an X matrix;
    determining means configured to determine the home price index using the formula $\hat{b}=(X'X)^{-1}X'Y$, wherein N is a number of sale pairs occurring within a duration of T time periods, the Y matrix is an $N\times 1$ matrix of the change in the log price of individual properties, the X matrix is an $N\times(T-1)$ matrix of 0, 1, or $-1$, and $\hat{b}$ is a $(T-1)\times 1$ matrix of log price indices; and
    outputting means for outputting the determined home price index.

9. The system of claim 8, wherein the calculating means accesses sale price ($p_1$), resale price ($p_2$), sale time period ($t_1$), and resale time period ($t_2$) data for the N sale pairs occurring over the T time periods with the computer; initializes a $T\times T$ matrix W with zeros wherein each element of W has a row and column coordinate of (x, y); determines the number of properties ($n_{(t_1,t_2)}$) for which a sale occurs in a first time period ($t_1$) and a resale occurs in a second time period ($t_2$); adds $-n_{(t_1,t_2)}$ to each element of W for which ($x=t_1, y=t_2$) and ($x=t_2, y=t_1$); sums the values in each column of W and entering the negative of the sum at the diagonal element (x,y) at which x=y; and removes the row and column of W that correspond to the base period to yield the X'X matrix to calculate the X'X matrix.

10. The system of claim 8, wherein the calculating means initializes a $T\times T$ matrix R with zeros wherein each element of R has a row and column coordinate of (x, y); determines for each property, the difference between the log of the sales price (log $p_1$) at the first time period ($t_1$) and the log of the resale price (log $p_2$) at a second time period ($t_2$); determines for each pair of time periods ($t_1,t_2$) where $t_1<t_2$, the sum of the log price differences of all those properties with a sale at the first time period $t_1$ and a resale at the second time period $t_2$; adds the log price difference sum for each time period pair ($t_1, t_2$) to the (x,y) element of R at which $x=t_1$ and $y=t_2$; adds the negative of the log price difference sum for each time period ($t_1, t_2$) to the (x,y) element of R at which $x=t_2$ and $y=t_1$; sums the values in each column of R; initializes a $T\times 1$ column vector S with zeros; enters the sum of the values of each column of R in a corresponding column element of S; and removes the entry of S that corresponds to the base period to calculate the X'Y matrix.

* * * * *